United States Patent
Li et al.

(10) Patent No.: US 11,764,656 B2
(45) Date of Patent: Sep. 19, 2023

(54) ROTOR SUPPORT, ROTOR, MOTOR, AND WIND TURBINE

(71) Applicant: XINJIANG GOLDWIND SCIENCE & TECHNOLOGY CO., LTD., Urumqi (CN)

(72) Inventors: Yanhui Li, Beijing (CN); Liang Peng, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 0 days.

(21) Appl. No.: 17/757,561

(22) PCT Filed: Jun. 10, 2020

(86) PCT No.: PCT/CN2020/095346
§ 371 (c)(1),
(2) Date: Jun. 16, 2022

(87) PCT Pub. No.: WO2021/120546
PCT Pub. Date: Jun. 24, 2021

(65) Prior Publication Data
US 2023/0040807 A1   Feb. 9, 2023

(30) Foreign Application Priority Data

Dec. 20, 2019 (CN) .......................... 201911330518.0

(51) Int. Cl.
*H02K 21/02* (2006.01)
*F03D 9/25* (2016.01)
(Continued)

(52) U.S. Cl.
CPC ......... *H02K 21/026* (2013.01); *F03D 1/0691* (2013.01); *F03D 9/25* (2016.05); *H02K 7/183* (2013.01); *F05D 2220/76* (2013.01)

(58) Field of Classification Search
CPC ........ H02K 21/026; H02K 7/183; F03D 9/25; F05D 2220/76
See application file for complete search history.

(56) References Cited

U.S. PATENT DOCUMENTS 5,475,276 A * 12/1995 Shiga ...................... H02K 5/04
                                                          310/154.19
5,698,914 A * 12/1997 Shiga ...................... H02K 9/28
                                                          310/85
(Continued)

FOREIGN PATENT DOCUMENTS

| CN | 1627598 A | 6/2005 |
| CN | 1653672 A | 8/2005 |

(Continued)

OTHER PUBLICATIONS

International Search Report in corresponding International Application No. PCT/CN2020/095346 dated Sep. 7, 2020 (8 pages).
(Continued)

*Primary Examiner* — Pedro J Cuevas
(74) *Attorney, Agent, or Firm* — Bayes PLLC (57) ABSTRACT

A rotor support, a rotor, a motor, and a wind turbine are provided. The rotor support includes a magnetic yoke and a reinforcement portion provided on a first side surface of the magnetic yoke; a second side surface of the magnetic yoke is configured to operably dispose a magnet of a rotor; the reinforcement portion covers each magnetic circuit area, which can generate a partial magnetic circuit, of the first side surface; the sum of the radial thicknesses of the reinforcement portion and the magnetic yoke overlapped is greater than a preset thickness, and the radial thickness of the magnetic yoke is less than the preset thickness.

17 Claims, 4 Drawing Sheets

(51) Int. Cl.
*F03D 1/06* (2006.01)
*H02K 7/08* (2006.01)
*H02K 7/18* (2006.01)

(56) References Cited

U.S. PATENT DOCUMENTS

| | | | | |
|---|---|---|---|---|
| 5,723,929 | A * | 3/1998 | Niimi | H02K 1/17 310/152 |
| 5,744,887 | A * | 4/1998 | Itoh | H02K 1/278 310/156.28 |
| 6,097,125 | A * | 8/2000 | Park | H02K 1/34 310/156.28 |
| 6,541,887 | B2 * | 4/2003 | Kawamura | B60W 10/08 903/952 |
| 7,038,343 | B2 * | 5/2006 | Agnes | H02K 1/2786 310/43 |
| 7,057,326 | B2 * | 6/2006 | Ren | H02K 1/32 310/156.28 |
| 7,088,024 | B2 * | 8/2006 | Agnes | H02K 5/00 310/43 |
| 7,091,642 | B2 * | 8/2006 | Agnes | H02K 5/1735 310/43 |
| 7,183,683 | B2 * | 2/2007 | Shafer | H02K 5/128 310/104 |
| 7,423,357 | B2 * | 9/2008 | Takahashi | H02K 29/03 310/156.21 |
| 8,147,198 | B2 * | 4/2012 | Baskin | B64C 27/32 416/143 |
| 8,497,612 | B2 * | 7/2013 | Minowa | F03D 9/25 290/55 |
| 8,621,896 | B2 * | 1/2014 | Kim | H02K 1/30 68/140 |
| 9,199,731 | B2 * | 12/2015 | Stamps | B29C 70/46 |
| 9,644,304 | B2 * | 5/2017 | Kim | H02K 1/28 |
| 10,122,228 | B2 * | 11/2018 | Chong | H02K 15/14 |
| 10,177,618 | B2 * | 1/2019 | Creedon | H02K 1/28 |
| 10,236,740 | B2 * | 3/2019 | Kimpara | H02K 3/30 |
| 10,322,798 | B2 * | 6/2019 | Stamps | B29C 70/342 |
| 11,025,112 | B2 * | 6/2021 | Brookes | H02K 1/278 |
| 2002/0047448 | A1 * | 4/2002 | Kawamura | H02K 21/048 903/952 |
| 2004/0084980 | A1 | 5/2004 | Yamaguchi et al. | |
| 2004/0090135 | A1 | 5/2004 | Maslov et al. | |
| 2005/0127775 | A1 * | 6/2005 | Lee | H02K 1/187 310/58 |
| 2007/0040462 | A1 * | 2/2007 | Yamaguchi | H02K 7/061 310/81 |
| 2007/0058291 | A1 * | 3/2007 | Shirai | G11B 17/038 |
| 2007/0163306 | A1 * | 7/2007 | Kim | H02K 1/2786 68/140 |
| 2008/0284275 | A1 | 11/2008 | Dowhan | |
| 2009/0001833 | A1 * | 1/2009 | Freixas Vila | H02K 1/27 310/154.03 |
| 2009/0134733 | A1 * | 5/2009 | Matsubara | H02K 29/03 310/156.64 |
| 2010/0253085 | A1 * | 10/2010 | Minowa | F03D 9/25 290/55 |
| 2010/0295319 | A1 | 11/2010 | Britnell | |
| 2012/0133230 | A1 * | 5/2012 | Jansen | H02K 15/03 29/596 |
| 2012/0201683 | A1 * | 8/2012 | Stamps | B29C 35/02 264/258 |
| 2013/0270953 | A1 | 10/2013 | Rasmussen | |
| 2014/0102152 | A1 * | 4/2014 | Kim | H02K 1/30 68/140 |
| 2016/0083086 | A1 * | 3/2016 | Stamps | B29C 70/342 264/258 |
| 2017/0163118 | A1 * | 6/2017 | Kimpara | H02K 1/2706 |
| 2019/0245405 | A1 | 8/2019 | Moore et al. | |
| 2022/0200381 | A1 * | 6/2022 | Liu | H02K 7/14 |

FOREIGN PATENT DOCUMENTS

| | | | |
|---|---|---|---|
| CN | 102439823 A | 5/2012 | |
| CN | 202455182 U | 9/2012 | |
| CN | 207234559 U | 4/2018 | |
| CN | 108777521 A | 11/2018 | |
| CN | 109950991 A | 6/2019 | |
| CN | 110120731 A | 8/2019 | |
| CN | 110445337 A | 11/2019 | |
| DE | 19514711 A1 | 10/1996 | |
| DE | 102012219003 A1 | 4/2014 | |
| EP | 1492213 A1 | 12/2004 | |
| EP | 1541738 A2 | 6/2005 | |
| EP | 2056432 A1 * | 5/2009 | F04D 13/027 |
| JP | 2002136010 A | 5/2002 | |
| TW | 200709537 A | 3/2007 | |

OTHER PUBLICATIONS

Office Action in related Chinese Application No. 201911330518.0 dated Feb. 18, 2022 (16 pages with translation).

Extended European Search Report in related European Application No. 20904199.5 dated Jan. 9, 2023 (9 pages).

* cited by examiner

ROTOR SUPPORT, ROTOR, MOTOR, AND WIND TURBINE

CROSS-REFERENCE TO RELATED APPLICATIONS

This application is a national stage of International Application No. PCT/CN2020/095346, filed on Jun. 10, 2020, which claims priority to Chinese Patent Application No. 201911330518.0, filed on Dec. 20, 2019. The entire contents of each of the above-identified applications are expressly incorporated herein by reference.

TECHNICAL FIELD

The present application relates to the technology field of electric machines, and in particular to a rotor support, a rotor, an electric machine and a wind turbine.

BACKGROUND

A magnetic circuit is formed in a rotor and a stator of an electric machine, and a magnetic pressure drop of the magnetic circuit mainly occurs at an air gap between the rotor and the stator. Specifically, about 80% or more of the magnetic pressure drop occurs at the air gap.

In order to increase a value of magnetic flux density at the air gap, it is required to minimize the magnetic resistance at other positions except the air gap. In the conventional technology, the magnetic resistance of a magnetic yoke in the rotor is reduced by increasing a thickness of the magnetic yoke, so as to increase the value of magnetic flux density at the air gap. However, the overall weight of the rotor support is increased, resulting in waste of materials.

SUMMARY

With regard to deficiencies of the conventional technology, a rotor support, a rotor, an electric machine and a wind turbine are provided according to the present application.

In a first aspect, a rotor support is provided according to an embodiment of the present application. The rotor support includes a magnetic yoke and a reinforcing portion arranged on a first side face of the magnetic yoke, where a second side face of the magnetic yoke is configured to allow a magnet of a rotor to be operably arranged thereon; the reinforcing portion covers each of magnetic circuit areas, which is configured generate part of magnetic circuits, of the first side face, a sum of radial thicknesses of the reinforcing portion and the magnetic yoke is greater than a preset thickness, and a radial thickness of the magnetic yoke is smaller than the preset thickness.

In a second aspect, a rotor is provided according to an embodiment of the present application. The rotor includes a plurality of magnets, and the rotor support according to the embodiment of the present application, where the plurality of magnets are arranged on the second side face of the magnetic yoke of the rotor support, and distributed at intervals along a circumference direction of the magnetic yoke; and for each two adjacent magnets, with opposite polarities, of the plurality of magnets, parts, close to each other, of the two adjacent magnets are directly opposite to a corresponding magnetic circuit area of the magnetic circuit areas on the first side face.

In a third aspect, an electric machine is provided according to an embodiment of the present application. The electric machine is a motor or a generator, which includes a stator and the rotor according to the second aspect, where the stator and the rotor are coaxially arranged.

In a fourth aspect, a wind turbine is provided according to an embodiment of the present application. The wind turbine includes the electric machine according to the third aspect, and the electric machine is a generator.

The additional aspects and advantages of the present application will be further described hereinafter, which will become obvious from the following description or be understood through the practice of the present application.

BRIEF DESCRIPTION OF DRAWINGS

The above and/or additional aspects and advantages of the present application will become obvious and easy to understand with reference to the following description of embodiments in conjunction with the drawings.

Reference numerals are as follows:

| 100 | rotor, | 10 | rotor support, |
|---|---|---|---|
| 1 | magnetic yoke, | 11 | first side face, |
| 12 | second side face, | 2 | reinforcing portion, |
| 21 | blocks of reinforcing portion 2, | | |
| 3 | magnet, | 200 | stator, |
| 4 | stator core, | 41 | stator teeth, |
| 5 | winding. | | |

DETAILED DESCRIPTIONS

The present application will be described in detail hereinafter, examples of embodiments of the present application are illustrated in drawings, in which the same or similar reference numerals represent the same or similar elements or elements with the same or similar functions throughout the description. In addition, if a detailed description of the known technology is unnecessary for the illustrated features of the present application, it will be omitted. The embodiments described hereinafter with reference to the drawings are only exemplary embodiments which are only used to explain the present application, which should not be construed to limit the present application.

It should be understood by those skilled in the art that all terms (including technical and scientific terms) used herein have the same meaning as commonly understood by those ordinarily skilled in the technical field to which the present application belongs, unless otherwise defined. It should also be understood that terms such as those defined in a general dictionary should be understood to have the meaning consistent with that in the context of the conventional technology, and should not be interpreted in an idealized or overly formal sense unless specifically defined herein.

In this application, various directions of each component are defined as follows: "radial direction" refers to a direction of a diameter of rotating components such as a rotor, "axial direction" refers to a direction of a rotational axis of the rotating components such as the rotor, and "circumferential direction" refers to a circumferential direction of the rotating components such as the rotor.

Figure 1:
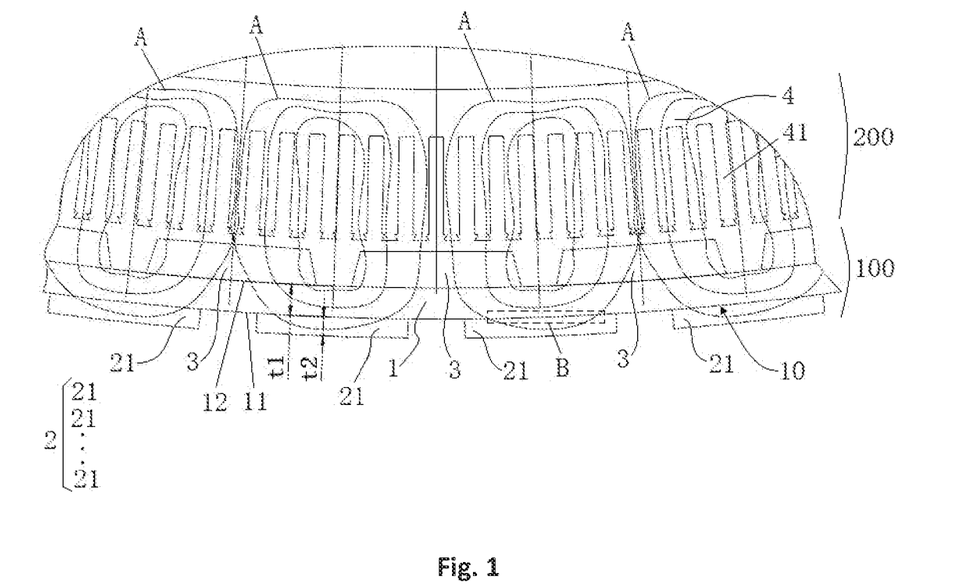
FIG. 1 is a schematic view of the structure of an electric machine according to an embodiment of the present application, in which a partial structure of a rotor support according to the embodiment of the present application is shown.
Figure 4:
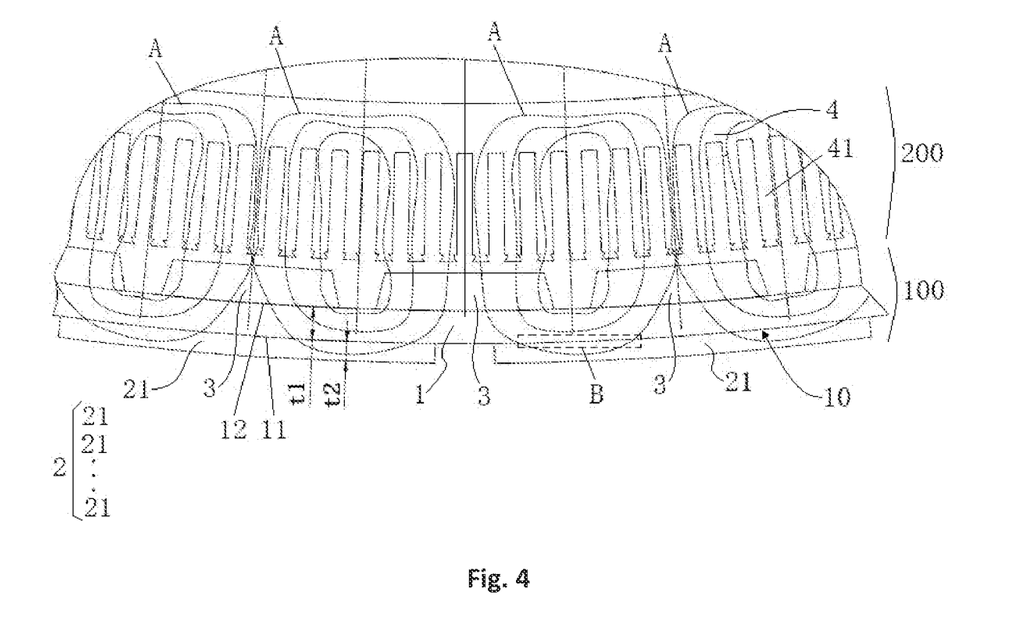
FIG. 4 is a schematic view of the structure of another electric machine according to an embodiment of the present application, in which a partial structure of another rotor support according to the embodiment of the present application is shown.
Figure 5:
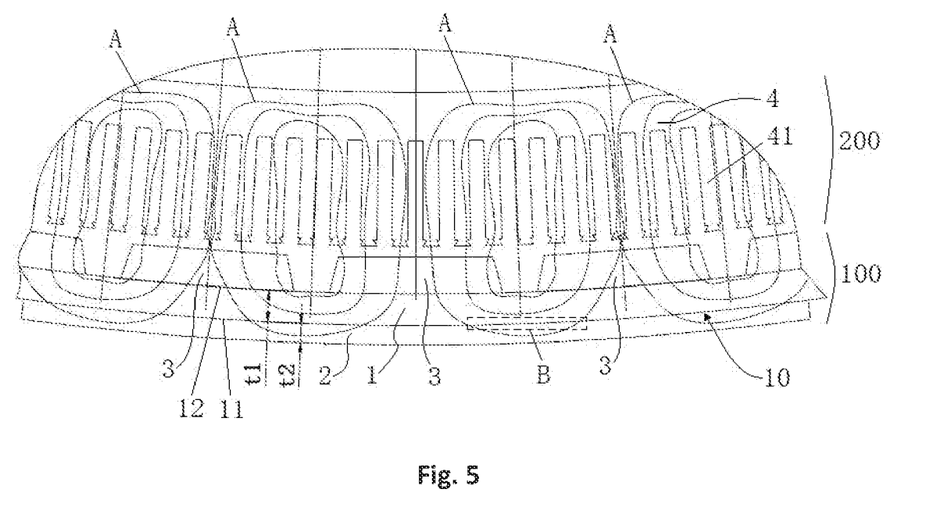
FIG. 5 is a schematic diagram view of the structure of yet another electric machine according to an embodiment of the present application, in which a partial structure of yet another rotor support according to the embodiment of the present application is shown.

A rotor support 10 is provided according to an embodiment of the present application. The rotor support 10 forms a part of the structure of a rotor of an electric machine, and the rotor and a stator of the motor are rotatable relative to each other. As shown in FIGS. 1, 4 and 5, the rotor support 10 is annular-shaped and includes an annular-shaped magnetic yoke 1. The magnetic yoke 1 includes a first side face 11 located at a radially outer side and at an outer annular surface, and a second side face 12 located at a radially inner side and at an inner annular surface. A reinforcing portion 2 is arranged on the first side face 11 of the magnetic yoke 1, and magnets 3 are arranged on the second side face 12 of the magnetic yoke 1. Each of the magnets 3 is a block structure extending along the axial direction, and the magnets 3 are attached to the second side face 12 along the circumferential direction at intervals. The reinforcing portion 2 is a block structure extending along the axial direction and arranged at intervals on the first side face 11 along the circumferential direction.

The reinforcing portion 2 covers each of magnetic circuit areas, which is configured to generate part of a magnetic circuit, of the first side face 11, a sum of radial thicknesses of the reinforcing portion 2 and the magnetic yoke 1 which are superposed is greater than a preset thickness, and a radial thickness of the magnetic yoke 1 is smaller than the preset thickness. The preset thickness will be described in detail below.

It should be noted that the rotor support 10 according to the embodiment of the present application is applicable to an outer rotor electric machine or an inner rotor electric machine. The rotor support 10 shown in FIGS. 1, 4 and 5 is applied to an outer rotor electric machine, the first side face 11 of the magnetic yoke 1 is an outer side face, and the second side face 12 of the magnetic yoke 1 is an inner side face. If the rotor support 10 is applied to an inner rotor electric machine, the first side face 11 of the magnetic yoke 1 is an inner side face, and the second side face 12 of the magnetic yoke 1 is an outer side face.

It should be noted by those skilled in the art that, in the electric machine to which the rotor support 10 according to the embodiment of the present application belongs, paths of the magnetic circuits are determined based on the positions and arrangement of the magnets 3, and the paths of the magnetic circuits determine the position of magnetic circuit areas of the magnetic yoke 1. Therefore, the positions of the magnetic circuit areas of the magnetic yoke 1 may be determined based on the positions and arrangement of the magnets 3 (for example, in an optional embodiment, the positions and arrangement of the magnets 3 can be determined based on a predetermined design of the rotor support 10, so that the positions of the magnetic circuit areas of the magnetic yoke 1 can be determined). Taking FIGS. 1, 4 and 5 as an example, a plurality of magnets 3 are arranged on the second side face 12 of the magnetic yoke 1 of the rotor support 10 and are distributed at intervals along a circumferential direction of the magnetic yoke 1, and each two adjacent magnets 3 of the plurality of magnets 3 have opposite polarities. The loops indicated by A in FIGS. 1, 4 and 5 represent the magnetic circuits, and the dashed box B defines one of the magnetic circuit areas of the magnetic yoke 1.

In FIGS. 1, 4 and 5, the radial thickness of the magnetic yoke 1 may be t1, the radial thickness of the reinforcing portion 2 may be t2, and the sum of the radial thicknesses of the reinforcing portion 2 and the magnetic yoke 1 which are superposed may be (t1+t2). In the embodiment of the present application, the preset thickness T may be determined according to a required value of magnetic flux density at the air gap of the electric machine to which the rotor support 10 belongs. The preset thickness is required to at least meet the following requirements: in a case that the sum of the radial thicknesses of the reinforcing portion 2 and the magnetic yoke 1 which are superposed is greater than the preset thickness, the value of magnetic flux density at the air gap of the electric machine to which the rotor support 10 belongs can be greater than or equal to the required value of magnetic flux density. In other words, the preset thickness T may be equivalent to the thickness T of the magnetic yoke 1 which meets the required value of magnetic flux density at the air gap of the electric machine in a case that there is no reinforcing portion 2 provided on the magnetic yoke 1. In a case that the reinforcing portion 2 is provided, the radial thickness of a portion, which is not covered by the reinforcing portion 2, of the newly designed magnetic yoke may be designed to be smaller than the preset thickness T, so as to reduce the thickness of the magnetic yoke 1 of the rotor support electric machine on the premise that the value of magnetic flux density is satisfied, which reduces the overall weight of the rotor support and thus reducing the cost of the electric machine.

In the rotor support 10 according to the embodiment of the present application, since the sum of the radial thicknesses of the reinforcing portion 2 and the magnetic yoke 1 which are superposed may be greater than the preset thickness T, the value of magnetic flux density at the air gap of the electric machine to which the rotor support 10 belongs is greater than or equal to the required value of magnetic flux density. Compared with the conventional method of increasing the thickness of the entire magnetic yoke 1 to the preset thickness, in the rotor support 10 according to the embodiment of the present application, with the reinforcing portion 2 being arranged on part of the magnetic yoke 1, the magnetic resistance is reduced, which not only satisfies the requirements of magnetic flux density at the air gap of the electric machine, but also effectively reduce the weight of the rotor support 10.

Figure 2:
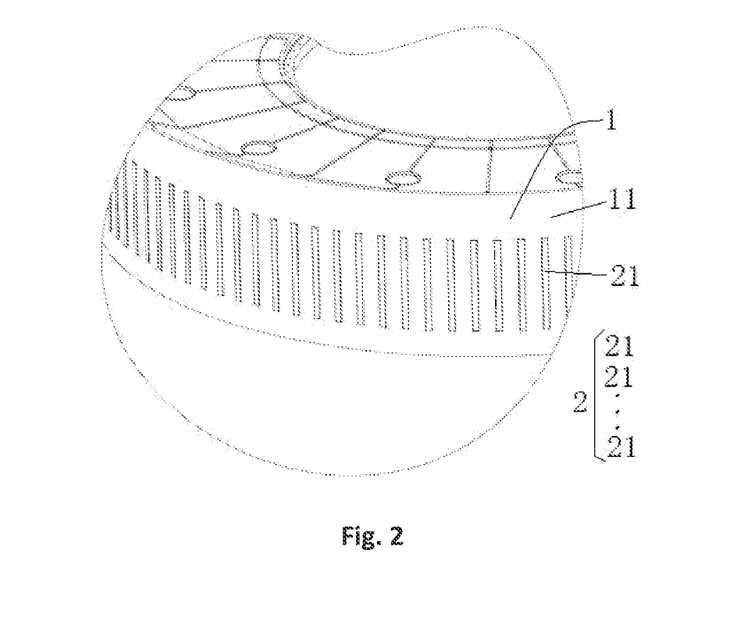
FIG. 2 is a schematic view showing FIG. 1 according to the embodiment of the present application from another perspective.

In one embodiment of the present application, as shown in FIGS. 1 and 2, the reinforcing portion 2 includes multiple blocks 21. The multiple blocks 21 are arranged on the first side face 11 at intervals along the circumferential direction of the magnetic yoke 1, and each of the blocks 21 covers at least one of the magnetic circuit areas.

An extension direction of each of the blocks 21 on the magnetic yoke 1 is determined according to an extension direction of each of the magnets 3. In an optional embodiment, in a case that the magnet 3 is arranged in a skewed-pole manner, the block 21 is arranged obliquely relative to the axial direction of the magnetic yoke 1, and the block 21 and the corresponding magnet 3 have a same inclination angle. A length of a projection of each of the blocks 21 in the axial direction of the magnetic yoke 1 is smaller than an axial length of the magnetic yoke 1. In an optional embodiment, in a case that the magnet 3 is not arranged in the skewed-pole manner, the magnet 3 is parallel to the axial direction of the magnetic yoke 1, the block 21 is also parallel to the axial direction of the magnetic yoke 1, and a length of each of the blocks 1 is smaller than the axial length of the magnetic yoke 1.

In an optional embodiment, taking FIGS. 1 and 2 as an example, the number of the blocks 21 on the first side face 11 of the magnetic yoke 1 is equal to that of the magnetic circuit areas, and each of the blocks 21 has a width in the circumferential direction that is great enough to cover a corresponding magnetic circuit area.

In an optional embodiment, the number of the blocks 21 on the first side face 11 of the magnetic yoke 1 may also be less than the number of the magnetic circuit areas, and at least one of the blocks 21 has a width that covers two or more magnetic circuit areas. Taking FIG. 4 as an example, the number of the blocks 21 on the first side face 11 of the magnetic yoke 1 is half of the number of the magnetic circuit areas, and each of the blocks 21 covers two corresponding magnetic circuit areas. In an optional embodiment, in a case that the number of the blocks 21 on the first side face 11 of the magnetic yoke 1 is less than the number of the magnetic circuit areas, the number of the magnetic circuit areas covered by each of the blocks 21 is not necessarily equal, as long as each of the magnetic circuit areas is covered by the reinforcing portion 2.

With the reinforcing portion 2 being designed as multiple blocks 21, the overall volume of the reinforcing portion 2 is reduced to a great extent on the premise that each of the magnetic circuit areas is covered by the reinforcing portion 2, which can increase the effective utilization rate of the reinforcing portion 2 and effectively reduce the weight of the rotor support 10.

In an optional embodiment of the present application, a dimension of the blocks 21 parallel to the axial direction of the magnetic yoke 1 is smaller than an axial dimension of the magnetic yoke 1. On the premise of ensuring that each of the magnetic circuit areas is covered by the blocks 21, the size of the blocks 21 is further reduced in the axial direction of the magnetic yoke 1, which further increases the effective utilization rate of the reinforcing portion 2, and thereby effectively reducing the weight of the rotor support 10.

Figure 6:
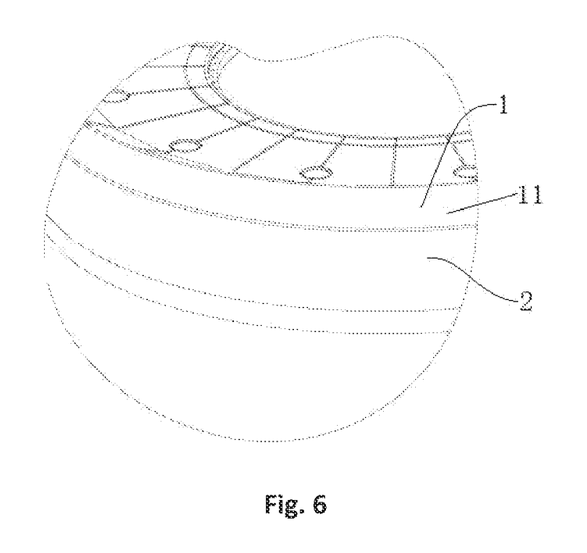
FIG. 6 is a schematic view showing FIG. 5 according to the embodiment of the present application from another perspective.

In an optional embodiment of the present application, as shown in FIGS. 5 and 6, the reinforcing portion 2 is annular-shaped. The reinforcing portion 2 is arranged on the first side face 11 in a surrounding manner, to cover all the magnetic circuit areas. The axial dimension of the reinforcing portion 2 is smaller than the axial dimension of the magnetic yoke 1.

Those skilled in the art can understand that, with the axial dimension of the reinforcing portion 2 being smaller than the axial dimension of the magnetic yoke 1, when the reinforcing portion 2 and the magnetic yoke 1 according to the embodiment of the present application is treated as a whole, the overall weight is reduced compared to the manner in which the thickness of the magnetic yoke 1 is increased as a whole to a preset thickness.

In an optional embodiment, in a case that the reinforcing portion 2 is designed in an annular shape, the reinforcing portion 2 can be more easily manufactured or assembled, which facilitates improvement of the manufacture efficiency of the rotor support 10.

In an optional embodiment of the present application, the reinforcing portion 2 may be integrally formed with the magnetic yoke 1.

In an optional embodiment, the plurality of blocks 21 may be integrally formed with the magnetic yoke 1 by casting, and the blocks 21 are made of the same material as that of the magnetic yoke 1.

In an optional embodiment, the reinforcing portion 2 may be configured as a continuous annular structure, corresponding to the magnetic yoke 1, with a certain length extending in the axial direction. The annular-shaped reinforcing portion 2 and the magnetic yoke 1 are integrally formed by casting, and the reinforcing portion 2 is made of the same material as that of the magnetic yoke 1. In this way, the magnetic flux density of the magnetic yoke 1 can be enhanced entirely, and the arrangement of the reinforcing portion 2 is not limited to the arrangement of the magnets 3.

In an optional embodiment of the present application, the reinforcing portion 2 and the magnetic yoke 1 may be connected by at least one of welding, riveting, bonding or bolting.

In an optional embodiment, each of the blocks 21 is welded on the first side face 11 of the magnetic yoke 1. The material of the block 21 is a magnetically conductive material such as low carbon steel or electrical steel.

In an optional embodiment, the annular-shaped reinforcing portion 2 is sleeved on the first side face 11 of the magnetic yoke 1, and the reinforcing portion and the magnetic yoke are welded or bonded together. The material of the reinforcing portion 2 is a magnetically conductive material such as low carbon steel or electrical steel.

Based on the above inventive concept, a rotor 100 may be further provided according to the embodiment of the present application. As shown in FIGS. 1, 4 and 5, the rotor 100 includes multiple magnets 3 and the rotor support 10 according to the above embodiments of the present application. The multiple magnets 3 are arranged on the second side face 12 of the magnetic yoke 1 of the rotor support 10 and are distributed at intervals along the circumferential direction of the magnetic yoke 1.

For each two adjacent magnets 3 with opposite polarities, parts, close to each other, of the two adjacent magnets 3 are directly opposite to a corresponding magnetic circuit area on the first side face 11.

Taking FIGS. 1, 4 and 5 as an example, in the rotor 100, two adjacent magnets 3 have opposite polarities, one of the two adjacent magnets is an S-pole magnet 3 and the other is an N-pole magnet 3. In other words, the two adjacent magnets 3 with opposite polarities can generate a complete magnetic circuit. Therefore, the parts, close to each other, of the two adjacent magnets 3 with opposite polarities are directly opposite to a corresponding magnetic circuit area on the first side face 11. For the blocks 21 shown in the figures, each of the blocks 21 is directly opposite to the parts, close to each other, of the corresponding two adjacent magnets 3 with opposite polarities.

In an optional embodiment of the present application, an end of the reinforcing portion 2 extends beyond an end of the magnets 3 in the axial direction of the magnetic yoke 1. The above design can ensure that the thickness of the rotor support 10 in a length range of the entire magnets 3 meets the design requirements.

Figure 3:
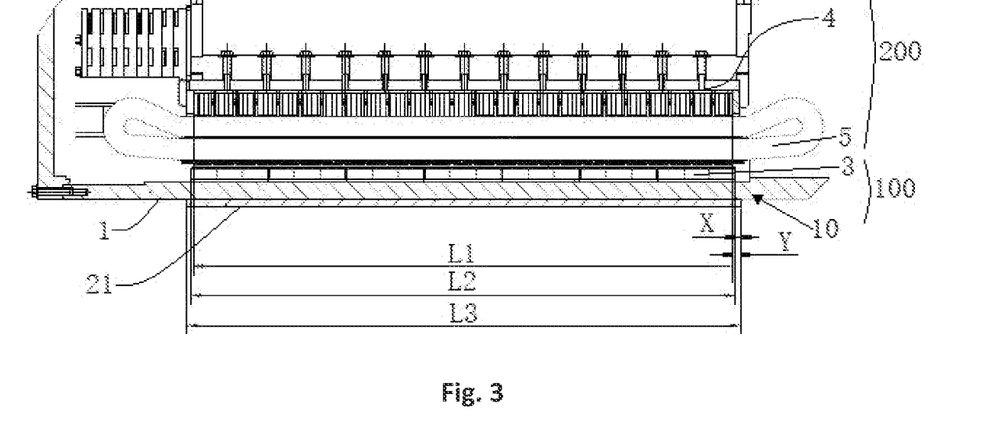
FIG. 3 is a cross-sectional view of FIG. 1 according to the embodiment of the present application.

As shown in FIG. 3, the length of the magnets 3 along the axial direction of the magnetic yoke 1 may be L2, the reinforcing portion 2 includes multiple blocks 21, and the length of the blocks 21 in the axial direction of the magnetic yoke 1 may be L3, and L3 is greater than or equal to L2. At a same side of the magnets 3 and the blocks 21, a distance between the end of the reinforcing portion 2 and the end of the magnets 3 may be X, which is greater than or equal to zero. In this way, the reinforcing portion 2 can cover the magnets 3 in the entire axial length, to enhance the magnetic flux density.

Figure 7:
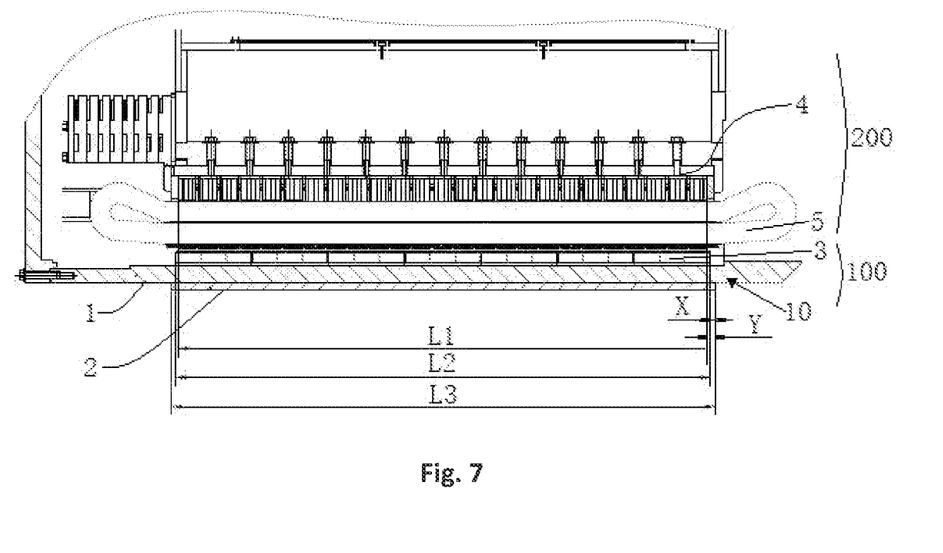
FIG. 7 is a cross-sectional view of FIG. 5 according to the embodiment of the present application.

As shown in FIG. 7, the length of the magnets 3 along the axial direction of the magnetic yoke 1 may be L2, the reinforcing portion 2 is annular-shaped, and the length of the reinforcing portion 2 in the axial direction of the magnetic yoke 1 (equivalent to the axial length of the reinforcing portion 2 itself) may be L3, and L3 is greater than or equal to L2. At a same side of the reinforcing portion 2 and the blocks 21, a distance between the end of the reinforcing portion 2 and the end of the magnets 3 is X, and X is greater than or equal to zero.

The rotor 100 according to the embodiment of the present application has the same inventive concept and the same advantageous effects as the above-mentioned embodiments. The content of the rotor 100 not shown in detail may be referred to the above-mentioned embodiments, which will not be repeated here.

Based on the above inventive concept, an electric machine is provided according to an embodiment of the present application, and the electric machine is a motor or a generator. As shown in FIGS. 1, 4 and 5, the electric machine includes a stator 200 and the rotor 100 according to the above embodiments of the present application, and the stator 200 and the rotor 100 are coaxially arranged.

Those skilled in the art may understand that the electric machine according to the embodiment of the present application may be an outer rotor electric machine or an inner rotor electric machine. The electric machine shown in FIG. 1 is an outer rotor electric machine, where the rotor 100 surrounds the outer side of the stator 200. If the electric machine is an inner rotor electric machine, the stator 200 surrounds the outer side of the rotor 100.

In an optional embodiment of the present application, the stator 200 includes a stator core 4. An end of the reinforcing portion 2 extends beyond an end of the stator core 4 in the axial direction of the magnetic yoke 1.

As shown in FIG. 3, a length of the stator core 4 in the axial direction of the magnetic yoke 1 (that is, the axial length of the stator core 4 itself) may be L1, the reinforcing portion 2 includes multiple blocks 21, a length of the blocks 21 in the axial direction of the magnetic yoke 1 may be L3, and L3 is greater than or equal to L1. At a same side of the stator core 4 and the blocks 21, a distance between the end of the reinforcing portion 2 and the end of the stator core 4 may be Y, and Y is greater than or equal to zero.

As shown in FIG. 7, a length of the stator core 4 in the axial direction of the magnetic yoke 1 (that is, the axial length of the stator core 4 itself) may be L1, the reinforcing portion 2 is annular-shaped, and the length of the reinforcing portion 2 in the axial direction of the magnetic yoke 1 (that is, the axial length of the reinforcing portion 2 itself) may be L3, and L3 is greater than or equal to L1. At the same side of the stator core 4 and the reinforcing portion 2, the distance between the end of the reinforcing portion 2 and the end of the stator core 4 may be Y, and Y is greater than or equal to zero.

In an embodiment of the present application, the length of the magnets 3 in the axial direction of the magnetic yoke 1 may be greater than or equal to the axial length of the stator core 4 itself. Therefore, the relationship among L1, L2 and L3 may be expressed as: $L3 \geq L2 \geq L1$.

As shown in FIGS. 1 and 3, the stator 200 further includes windings 5, the stator core 4 is provided with stator teeth 41 arranged at intervals, and the windings 5 are wound around the stator teeth 41. Other structures of the stator 200 are not described in detail here.

The electric machine according to the embodiment of the present application has the same inventive concept and the same advantageous effects as the above-mentioned embodiments, and the content of the electric machine not shown in detail may be referred to the above-mentioned embodiments, which will not be repeated here.

Based on the above inventive concept, a wind turbine is provided according to an embodiment of the present application. The wind turbine includes the electric machine according to the embodiment of the present application, and the electric machine is a generator.

The wind turbine according to the embodiment of the present application has the same inventive concept and the same advantageous effects as the aforementioned embodiments. The content of the wind turbine not shown in detail may be referred to the above embodiments, which is not repeated here.

By applying the embodiments of the present application, at least the following technical effects can be achieved.

In the rotor support, rotor, electric machine, and wind turbine according to the embodiments of the present application, since the sum of the radial thicknesses of the reinforcing portion and the magnetic yoke which are superposed is greater than the preset thickness, the value of magnetic flux density at the air gap of the electric machine to which the rotor support belongs is greater than or equal to the required value of magnetic flux density. Compared with the conventional method of increasing the thickness of the entire magnetic yoke to a preset thickness, in the rotor support according to the embodiment of the present application, by providing a reinforcing portion only on part of the magnetic yoke, the purpose of increasing the thickness to reduce the magnetic resistance can be achieved, which not only meets the requirements of magnetic flux density at the air gap of the electric machine, but also effectively reduces the weight of the rotor support.

In the description of the present application, it should be noted that the orientation or positional relationship indicated by the terms, such as "central", "upper", "lower", "front", "rear", "left", "right", "vertical", "horizontal", "top", "bottom", "inner", and "outer", are based on the orientation or positional relationship shown in the drawings, which are only used to facilitate the description of the present application and to simplify the description, rather than indicating or implying that the device or element referred to must have a specific orientation, or can only be configured and operated in a particular orientation. Therefore the above terms should not be construed as a limitation to the present application.

The terms "first" and "second" are only used for descriptive purposes, and should not be construed as indicating or implying relative importance or implicitly indicating the number of technical features referred to. Thus, features defined as "first", "second" may expressly or implicitly include one or more of that feature. In the description of this application, unless stated otherwise, "multiple" means two or more.

In the description of the present application, it should be noted that, terms "install", "link" and "connect" should be understood broadly, unless stated or defined specifically. For example, it may refer to being fixedly or detachably connected, or integrally connected; directly or indirectly connected through an intermediate media, or communication between insides of two components. For those skilled in the art, the specific meaning of the above terms in the present application can be understood in the light of specific circumstances.

In the description of this specification, specific features, structures, materials or characteristics may be combined in any one or more embodiments or examples in a suitable manner. Those described above are only some embodiments of the present application. It should be noted that, for those skilled in the art, improvements and modifications may also be made without departing from the concept of the application, and these improvements and modifications should also be included in the scope of protection of the present application.

The invention claimed is:

1. A rotor support, comprising:
a magnetic yoke having a first side face and a second side face on an opposite side of the first side face, wherein a plurality of magnets of a rotor are arranged on the second side face and each pair of adjacent magnets define a portion of the magnetic yoke between the pair of adjacent magnets as one of a plurality of magnetic circuit areas of the magnetic yoke; and
a reinforcing portion arranged on the first side face of the magnetic yoke;
wherein:
the reinforcing portion covers all of the plurality of magnetic circuit areas, and
a sum of radial thicknesses of the reinforcing portion and the magnetic yoke is greater than a preset thickness, and a radial thickness of the magnetic yoke is smaller than the preset thickness.

2. The rotor support according to claim 1, wherein:
the reinforcing portion comprises a plurality of blocks,
the plurality of blocks are distributed at intervals along a circumferential direction of the magnetic yoke, and
each of the plurality of blocks covers at least one of the plurality of magnetic circuit areas.

3. The rotor support according to claim 2, wherein each of the plurality of blocks is parallel to an axial direction of the magnetic yoke, and a length of each of the plurality of blocks is smaller than an axial length of the magnetic yoke.

4. The rotor support according to claim 1, wherein:
the reinforcing portion is annular-shaped,
the reinforcing portion is arranged on the first side face in a surrounding manner, and
an axial dimension of the reinforcing portion is smaller than an axial dimension of the magnetic yoke.

5. The rotor support according to claim 1, wherein:
the reinforcing portion is integrally formed with the magnetic yoke, or
the reinforcing portion and the magnetic yoke are connected by at least one of welding, riveting, bonding, or bolting.

6. A rotor, comprising:
a plurality of magnets; and
a rotor support, comprising:
a magnetic yoke having a first side face and a second side face on an opposite side of the first side face, wherein the plurality of magnets are arranged on the second side face and each pair of adjacent magnets define a portion of the magnetic yoke between the pair of adjacent magnets as one of a plurality of magnetic circuit areas of the magnetic yoke; and
a reinforcing portion arranged on the first side face of the magnetic yoke;
wherein:
the reinforcing portion covers all of the plurality of magnetic circuit areas; and
the plurality of magnets are distributed at intervals along a circumferential direction of the magnetic yoke.

7. The rotor according to claim 6, wherein an end of the reinforcing portion extends beyond ends of the plurality of magnets in an axial direction of the magnetic yoke.

8. An electric machine, being a motor or a generator, comprising:
a stator; and
a rotor, comprising:
a plurality of magnets; and
a rotor support, comprising:
a magnetic yoke having a first side face and a second side face on an opposite side of the first side face, wherein the plurality of magnets are arranged on the second side face and each pair of adjacent magnets define a portion of the magnetic yoke between the pair of adjacent ma nets as one of a plurality of magnetic circuit areas of the magnetic yoke; and
a reinforcing portion arranged on the first side face of the magnetic yoke;
wherein:
the reinforcing portion covers all of the plurality of magnetic circuit areas; and
the plurality of magnets are distributed at intervals along a circumferential direction of the magnetic yoke; and
wherein the stator and the rotor are coaxially arranged.

9. The electric machine according to claim 8, wherein the stator comprises a stator core, and an end of the reinforcing portion extends beyond an end of the stator core along an axial direction of the magnetic yoke.

10. A wind turbine, comprising the electric machine according to claim 8, wherein the electric machine is a generator.

11. The electric machine according to claim 8, wherein:
the reinforcing portion comprises a plurality of blocks;
the plurality of blocks are distributed at intervals along a circumferential direction of the magnetic yoke; and
each of the plurality of blocks covers at least one of the plurality of magnetic circuit areas.

12. The electric machine according to claim 11, wherein each of the plurality of blocks is parallel to an axial direction of the magnetic yoke, and a length of each of the plurality of blocks is smaller than an axial length of the magnetic yoke.

13. The electric machine according to claim 8, wherein:
the reinforcing portion is annular-shaped;
the reinforcing portion is arranged on the first side face in a surrounding manner; and
an axial dimension of the reinforcing portion is smaller than an axial dimension of the magnetic yoke.

14. The electric machine according to claim 8, wherein an end of the reinforcing portion extends beyond ends of the plurality of magnets in an axial direction of the magnetic yoke.

15. The rotor according to claim 6, wherein:
the reinforcing portion comprises a plurality of blocks;
the plurality of blocks are distributed at intervals along a circumferential direction of the magnetic yoke; and each of the plurality of blocks covers at least one of the plurality of magnetic circuit areas.

16. The rotor according to claim 15, wherein each of the plurality of blocks is parallel to an axial direction of the magnetic yoke, and a length of each of the plurality of blocks is smaller than an axial length of the magnetic yoke.

17. The rotor according to claim 6, wherein:
the reinforcing portion is annular-shaped;
the reinforcing portion is arranged on the first side face in a surrounding manner; and
an axial dimension of the reinforcing portion is smaller than an axial dimension of the magnetic yoke.

* * * * *